US007080550B1

(12) United States Patent
Goris et al.

(10) Patent No.: US 7,080,550 B1
(45) Date of Patent: Jul. 25, 2006

(54) RATE TUBE MEASUREMENT SYSTEM

(75) Inventors: Norman H. Goris, Nashville, IN (US); Tamas Rauznitz, Columbus, IN (US); John K. Awad, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 10/917,528

(22) Filed: Aug. 13, 2004

Related U.S. Application Data

(60) Provisional application No. 60/494,562, filed on Aug. 13, 2003.

(51) Int. Cl.
*F02M 65/00* (2006.01)
*G01M 15/00* (2006.01)
*F01L 1/46* (2006.01)

(52) U.S. Cl. ...................... 73/119 A; 73/119 R; 73/116

(58) Field of Classification Search ............. 73/119 R, 73/119 A
See application file for complete search history.

(56) References Cited

U.S. PATENT DOCUMENTS 4,193,299 A 3/1980 Holzem et al.
5,058,553 A 10/1991 Kondo et al.
5,226,311 A * 7/1993 Scourtes ................... 73/119 A
5,619,969 A 4/1997 Liu et al.
5,801,308 A * 9/1998 Hara ........................... 73/223
5,895,844 A 4/1999 Krueger
6,062,201 A 5/2000 Nozawa et al.
6,142,121 A 11/2000 Nishimura et al.
6,484,573 B1 * 11/2002 Bundock et al. .......... 73/119 A
2001/0032620 A1 10/2001 Bundock et al.

FOREIGN PATENT DOCUMENTS

JP 08-121288 5/1996

OTHER PUBLICATIONS

Tadashi Ikeda et al., "Measurement of the Rate of Multiple Fuel Injection with Diesel Fuel and DME", Society of Automotive Engineers, Inc., 2001-01-0527, SAE Technical Paper Series, SAE 2001 World Congress Detroit, Michigan, Mar. 5-8, 2001.

(Continued)

*Primary Examiner*—Edward Lefkowitz
*Assistant Examiner*—Freddie Kirkland, III
(74) *Attorney, Agent, or Firm*—Nixon Peabody LLP; Tim L. Brackett, Jr.; J. Bruce Schelkopf

(57) ABSTRACT

A rate tube measurement system for measuring injected fuel and a method thereof are disclosed. In one embodiment, the system includes a fixture assembly, a rate tube fluidically connected to the fixture assembly to receive fuel injected by the fuel injector during, a pressure sensor positioned upstream of the rate tube that is adapted to measure pressure changes in the injected fuel and provide a pressure output, a flow meter that measures flow of injected fuel and provides a flow output indicative of the measured fuel flow, and a computing device that processes the duration of actuation, the pressure output and the flow output to determine injection information such as fuel injection quantity, variation, and rate shape.

34 Claims, 3 Drawing Sheets

OTHER PUBLICATIONS

Glenn R. Bower et al., "A Comparison of the Bosch and Zuech Rate of Injection Meters", 910724, pp. 1-9.

Milan Marcic, "A new Method for Measuring Fuel-Injection Rate", 980804, Society of Automotive Engineers, Inc., SAE Technical Paper Series, SAE 2001, International Congress and Exposition, Detroit, Michigan, Feb. 23-26, 1998, pp. 1-6.

Takamura et al., "A Study on Precise Measurement of Diesel Fuel Injection Rate", 920630, pp. 1-9.

Thomas W. Ryan, III, "Measurement of the Instantaneous Distribution of Momentum in Diesel Injection Nozzle Fuel Jets", 962004, SAE Technical Paper Series, International Fall Fuels & Lubricants Meeting & Exposition, San Antonio, Texas, Oct. 14-17, 1996, pp. 29-38.

www.onosokki.co.jp, "Pilot Fuel Injection Measurement System FJ-6000 Series", pp. 1-3.

* cited by examiner

RATE TUBE MEASUREMENT SYSTEM

This application claims priority to U.S. Provisional Application No. 60/494,562, filed Aug. 13, 2003, the contents of which are incorporated herein by reference.

BACKGROUND OF THE INVENTION

1. Field of the Invention

The present invention is directed to a rate tube measurement system for measuring fuel injected by a fuel injector.

2. Description of Related Art

The development of multi-pulse common rail injection systems in which fuel injectors are actuated to provide pilot and/or post injections as well as the primary injection has prompted the need for new, end-of-the-line, functional test equipment that can measure the fuel injected by the fuel injector. While positive displacement, piston type measurement systems are sufficiently accurate to measure the amount of fuel in the pilot and/or post injections as well as the primary injection in multi-pulse common rail injection systems, they are typically very complex and costly. Consequently, such positive displacement, piston type measurement systems, are not suitable for use in the manufacturing assembly line environment where numerous systems are required to test a significant number of fuel injectors.

Conventional rate tube measurement systems have the advantages of being more robust and providing a "true" rate shape. However, conventional rate tube measurement systems are not designed to measure fueling in multi-pulse common rail injection systems. In particular, conventional rate tube measurement systems are not adapted to measure the amount of fuel injected during pilot and/or post injections, as well as the primary injection.

SAE Paper 2001-01-0527 discloses a common-rail fuel injection rate measurement system consisting of a pressure chamber with pressure sensors, an amplifier box, an output processing unit, a data processing unit, and a volumetric flow-meter. The disclosed system also includes a back pressure sensor, a temperature sensor, a back pressure relief valve, and a discharge valve. However, the measurement system disclosed requires complex processing and filtering of the captured sensor output in order to derive information regarding the injection event such as fuel injection quantity, variation, and/or rate shape. Such filtering and complex processing is necessary to remove the noise in the acquired data caused by the fuel pressure pulses that are reflected within the disclosed system. However, development of such filters and methods for processing the acquired sensor output is expensive. In addition, such filtering and processing of the acquired sensor output can decrease the accuracy of the system since the quality of the filters and methods used to process the acquired sensor output can render the results inaccurate. Furthermore, because the system disclosed in the SAE Paper is designed for use in a laboratory environment where technicians can take their time in conducting the desired experiments, there are no provisions or features for expediting the measurement of the fuel injected by the fuel injector being tested.

Therefore, there exists an unfulfilled need for a measurement system for accurately measuring the amount of fuel injected by a fuel injector. There also exists an unfulfilled need for such a measurement system that provides accurate injection measurements, but reduces the filtering and processing requirements that are required for prior art systems. There further exists an unfulfilled need for such a measurement system that facilitates measurement of the fuel injection quantity, variation, and/or rate shape, which can be utilized in an manufacturing environment.

SUMMARY OF THE INVENTION

In view of the foregoing, one aspect of the present invention provides a measurement system for accurately measuring the amount of fuel injected by a fuel injector.

Another aspect of the present invention provides a measurement system that allows accurate injection measurements while reducing the filtering and processing requirements.

Still another aspect of the present invention provides a measurement system that facilitates measurement of the fuel injection quantity, variation, and/or rate shape, and that can be utilized in an manufacturing environment.

Yet another aspect of the present invention provides a method of measuring the amount of fuel injected by a fuel injector.

In accordance with one embodiment of the present invention, a rate tube measurement system for measuring injected fuel is provided, the system including a fixture assembly having an injector receiving opening sized to receive a fuel injector therein, a rate tube fluidically connected to the fixture assembly to receive fuel injected by the fuel injector during a plurality of injection events when the fuel injector is actuated, a pressure sensor positioned downstream of the injector receiving opening and upstream of the rate tube, the pressure sensor being adapted to measure pressure changes in the injected fuel and provide a pressure output, and a flow meter that measures flow of the injected fuel and provides a flow output indicative of the measured fuel flow. The system also includes a computing device that is electronically connected to the fuel injector to monitor duration of actuation of the fuel injector, the pressure sensor to receive the pressure output, and the flow meter to receive the flow output, the computing device being further adapted to process the duration of actuation, the pressure output and the flow output to determine injection information regarding at least one injection event. In this regard, the determined injection information may be fuel injection quantity, variation, and/or rate shape, and the injection event may be a single pulse injection and/or a multi-pulse injection.

In accordance with one embodiment of the rate tube measurement system, a purge port is provided that allows air to be purged from the injector receiving opening when the fuel injector is received therein. In another implementation, a current probe is provided which is electronically connected to the computing device to monitor actuation of the fuel injector. A temperature sensor is provided in another embodiment to measure the temperature of the fuel injected by the fuel injector, and to provide a temperature output to the computing device. In this regard, the computing device may be adapted to use the temperature output to correct the determined injection information to compensate for the temperature of the fuel injected.

In accordance with yet another implementation, the rate tube measurement system also includes a rupture disc positioned downstream of the fixture assembly and upstream of the flow meter to prevent over pressurization of the rate tube measurement system. A filter is provided in another embodiment, the filter being upstream of the flow meter to trap debris in the fuel and dampen pressure pulses in the rate tube. In yet another implementation, the rate tube measurement system further including a valve assembly that regulates fuel flow through the rate tube measurement system. A pressure gauge that measures and displays the back pressure of the fuel in the rate tube measurement system is provided in another embodiment. The rate tube measurement system of another embodiment further includes a spring loaded mechanical relief valve adapted to allow adjustment of the back pressure of the fuel in the rate tube measurement system to simulate cylinder pressure. In still another embodiment, the rate tube measurement system further includes an accumulator assembly positioned upstream of the flow meter that dampens pressure pulses in the rate tube measurement system. A remote purge supply that facilitates purging of the rate tube measurement system is provided in another implementation.

In one example embodiment, the flow meter of the rate tube measurement system is implemented as a coriolis mass flow meter that measures the mass of fuel flowing therethrough. The measured pressure changes are indicative of rate shape of the plurality of injection events so that in one embodiment, the computing device determines an area under a rate trace curve for each of the plurality of injection events based on the measured pressure changes. In another embodiment, the computing device is implemented as a computer having a program.

In accordance with another aspect of the present invention, a method of measuring the amount of fuel injected by a fuel injector is provided. In one embodiment, the method includes securing a fuel injector to a fixture assembly adapted to capture fuel injected by the fuel injector, actuating the fuel injector in a plurality of injection events and monitoring duration of actuation of the fuel injector during at least one injection event, measuring the pressure of the fuel injected by the fuel injector using a pressure sensor, conveying the fuel injected by the fuel injector through a rate tube, measuring flow of fuel through the rate tube, and determining injection information regarding the injection event based on the duration of actuation, the measured pressure, and the measured flow. The determined injection information may be fuel injection quantity, variation, and/or rate shape, and the injection event may be a single pulse injection and/or a multi-pulse injection.

In one embodiment of the method, the changes in the measured pressure being indicative of rate shape of the injection event. In this regard, the method may include calculating an area under a rate trace curve for the injection event based on the measured pressure changes, and determining variations in the area under the rate trace curves of different injection events to determine variation in shot-to-shot injection quantity.

In accordance with another embodiment, the method of measuring the amount of fuel injected by a fuel injector also includes purging air prior to measuring the pressure of the fuel injected. In still another embodiment, the method further includes measuring the temperature of the fuel injected by the fuel injector, and correcting the determined injection information to compensate for temperature of the fuel injected. The method in another embodiment includes measuring and adjusting back pressure of the fuel injected to simulate cylinder pressure. In yet another embodiment, the method further includes dampening pressure pulses of the fuel injected.

These and other aspects, features and advantages of the present invention will become more apparent from the following detailed description of the preferred embodiments of the present invention when viewed in conjunction with the accompanying drawings.

DETAILED DESCRIPTION OF THE PREFERRED EMBODIMENT

Figure 1A:
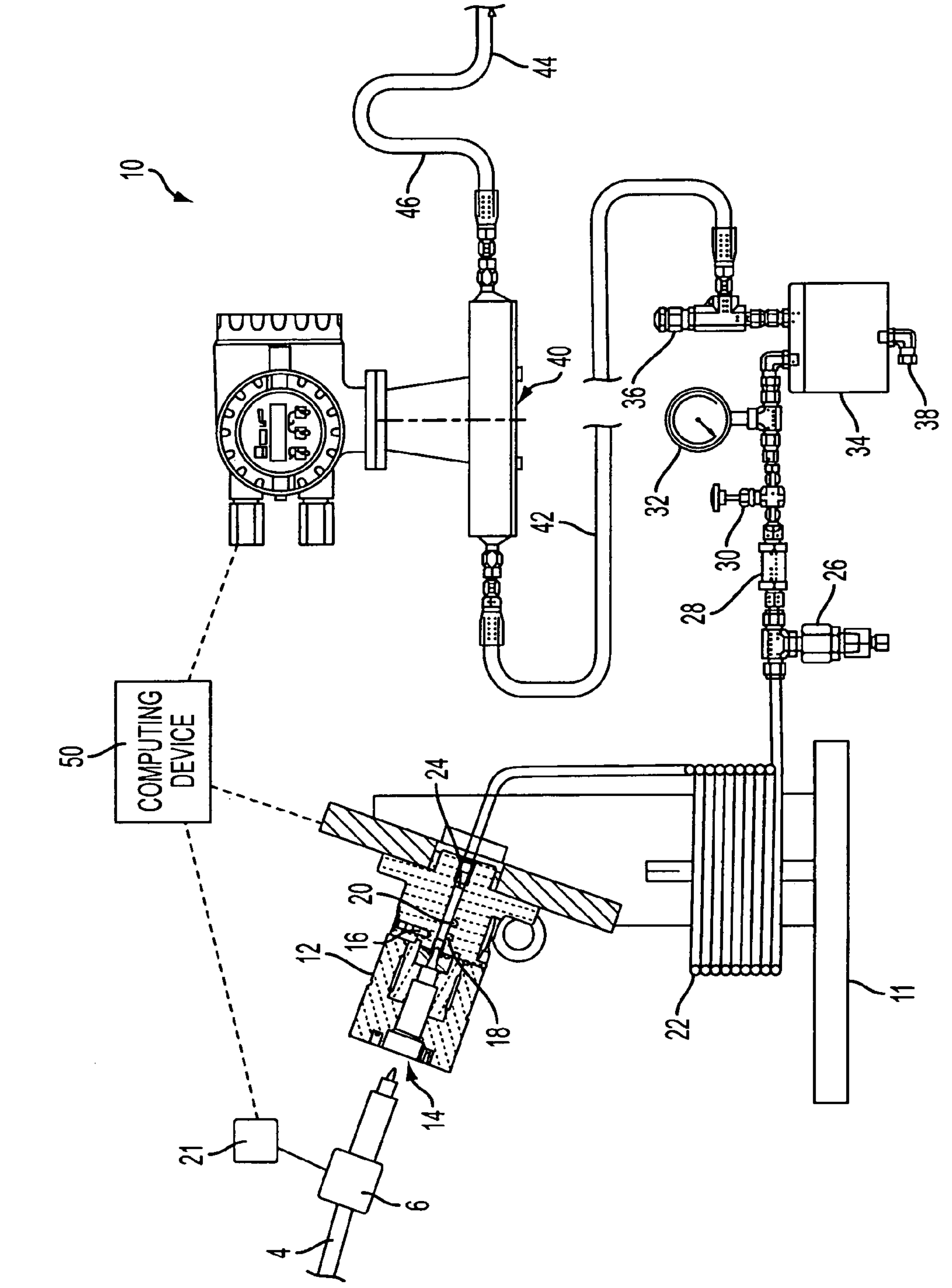
FIG. 1A is a schematic illustration of a rate tube measurement system in accordance with one preferred embodiment of the present invention.
Figure 1B:
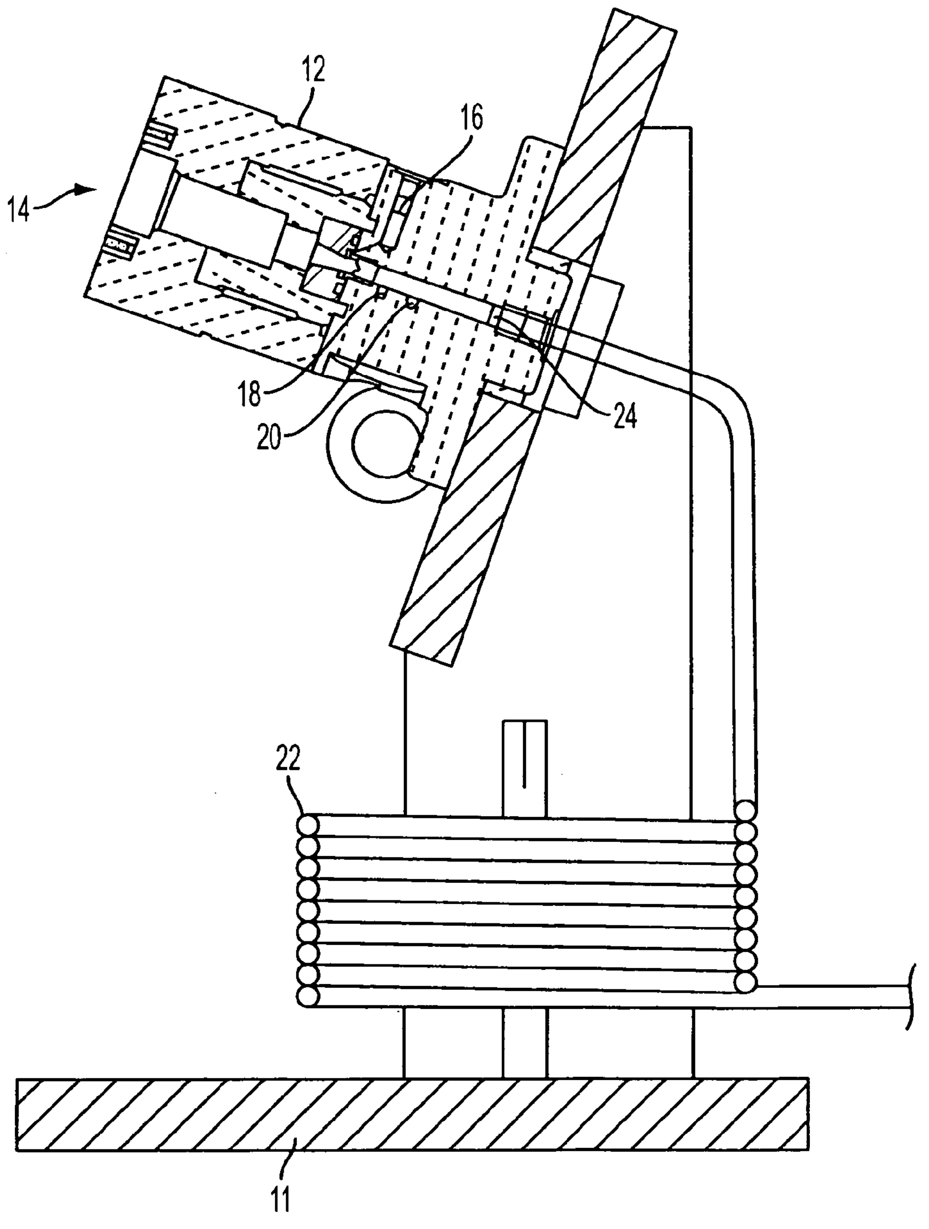
FIG. 1B is an enlarged schematic illustration of the fixture assembly shown in FIG. 1B.

FIGS. 1A and 1B show a schematic illustration of a rate tube measurement system 10 in accordance with one embodiment of the present invention, these figures being discussed together herein. As will be described in detail below, the rate tube measurement system 10 can be advantageously used to accurately measure injection rate of multi-pulse common rail injection systems. As noted, multi-pulse common rail injection systems actuate fuel injectors to provide pilot injections and/or post injections in addition to the primary injection during an injection event. As discussed in further detail below, the rate tube measurement system 10 is adapted to measure the fuel injection quantity, variation, and/or rate shape of the multi-pulse injections, such measurements not being economical or practical with prior art positive displacement piston type measurement systems. In addition, the present invention attains these measurements with minimal filtering and/or processing as compared to prior art systems so that accurate measurements can be obtained.

It should also be noted that whereas the present invention is especially advantageous when implemented to measure fuel injection quantity, variation, and/or rate shape of the multi-pulse injections, the present invention may also be used to measure such parameters of fuel injectors operable in a conventional, single injection pulse manner. As can be appreciated by one of ordinary skill in the art, multi-pulse common rail injection systems may be operated in a conventional manner to provide a single pulse injection. Thus, whereas the present invention is described in detail below in the context of accurately measuring multi-pulse fuel injections, the present invention is not limited thereto, but may also be used to accurately measure single pulse injections as well.

The illustrated embodiment of the rate tube measurement system 10 includes a fixture assembly 12 with a receiving opening 14 sized to receive a fuel injector 6 that is to be tested. FIGS. 1A and 1B illustrate a cross sectional view of the fixture assembly 12 for clarity purposes, and are discussed together herein. As noted, the fuel injector 6 may be operable to provide a single pulse injection, or to provide a multi-pulse injection. The fuel injector 6 is fluidically connected to a fuel supply 4 that provides pressurized fuel to the fuel injector 6. The tip of the fuel injector 6 to be tested is inserted into the receiving opening 14 and the fuel injector 6 is secured to the fixture assembly 12. A purge port 16 is provided at the top of the fixture assembly 12 to quickly purge air from the fixture assembly 12 after the fuel injector 6 is installed and secured to the fixture assembly 12. The purge port 16 is sealed upon insertion and securing of the fuel injector to the fixture assembly 12 during measurement. Of course, in other embodiments, a separate valve may be provided to close the purge port 16 during measurement.

Because this air does not have to be pushed through the remainder of the rate tube measurement system 10, the flow meter 40, as described in further detail below, is able to quickly give an accurate measurement of the injected fuel. As can be appreciated, this feature allows the rate tube measurement system 10 to be effectively used in manufacturing environments where testing of large number of fuel injectors must be performed quickly and efficiently.

The fixture assembly 12 of the rate tube measurement system 10 shown also includes a high speed pressure sensor 18 located just downstream of the injector receiving opening 14, the pressure sensor 18 being adapted to measure the pressure changes of the fuel in the rate tube measurement system 10 and to provide a pressure output, e.g. output signal. The pressure changes correspond to the amount of fuel injected by the fuel injector 6, and thus, is correlated to the rate shape of the injection. The fixture assembly 12 of the rate tube measurement system 10 is also provided with a temperature sensor 20 that measures the temperature of the fuel being injected, and provides a temperature output.

The fixture assembly 12 is connected to a rate tube 22 at a transition area 24, the transition area 24 preferably being a continuous, smooth surface to minimize disruption to the fuel flow so that any effects on measurements obtained through the rate tube measurement system 10 is minimized. In the illustrated embodiment, the rate tube 22 is positioned downstream of the pressure sensor 18. The rate tube 22 of the illustrated embodiment is elongated to have a substantial length. In the illustrated embodiment, the rate tube 22 is approximately 18 feet long. Of course, in other embodiments, the rate tube 22 may be of different length. The rate tube 22 is coiled in the manner shown in the illustrated embodiment so as to minimize the space requirements of the rate tube measurement system 10. The rate tube 22 is mounted to a stand 11 that supports the rate tube 22, preferably using plastic or hard rubber mounts. Such materials serve to dampen the pressure pulses in the rate tube between adjacent injection events. Such materials used for mounting also minimize any extraneous vibrations from the environment that is introduced into the fuel in the rate tube 22. Such material selections allow the pressure sensor 18 of the rate tube measurement system 10 to provide accurate pressure outputs with minimal noise caused by pressure pulse reflections and/or vibration from the environment.

The illustrated embodiment of the rate tube measurement system 10 is also provided with a rupture disc 26 at one end of the rate tube 22 that prevents over pressure conditions. The rupture disc 26 releases fuel therethrough in the event that the pressure of the fuel in the rate tube measurement system 10 exceeds the designed capacity of the rupture disc 26, thereby decreasing the pressure of the fuel in the rate tube measurement system 10. A filter 28 is provided to dampen any pressure reflections and/or to trap debris in the fuel before the debris is conveyed to the flow meter 40.

Downstream of the filter 28, a needle valve assembly 30 and a back pressure gauge 32 are provided. The back pressure gauge 32 is adapted to measure and display the average back pressure of the fuel in the rate tube measurement system 10. In this regard, an accumulator assembly 34 and a relief valve 36 are provided so as to allow adjustment of the back pressure in the rate tube measurement system 10 to simulate cylinder pressure in the engine. The back pressure may be adjusted by adjusting the pressure at which the relief valve 36 is actuated. By simulating the cylinder pressure, more realistic measurements of the injected fuel can be obtained by the rate tube measurement system 10. The relief valve 36 also prevents excessive back pressure, while an optional remote purge supply 38 may be provided to reduce purge time. In the above regard, the relief valve 36 in accordance with the illustrated embodiment is implemented with a spring actuated mechanical valve. Whereas an electrically actuated valve may be utilized in other embodiments, the applicants have found that a spring loaded mechanical valve responds faster to the pressure changes in the rate tube measurement system 10 than electrically actuated valves.

The rate tube measurement system 10 in accordance with the illustrated embodiment of the present invention is further provided with a flow meter 40 which is fluidically connected to the accumulator assembly 34 via hose 42. The flow meter 40 is adapted to measure the flow of fuel therethrough. In the preferred embodiment, the flow meter 40 is implemented as a coriolis mass flow meter. Whereas in other embodiments, the flow meter 40 may be implemented using, for example, a volumetric flow meter, the applicants have found that a coriolis mass flow meter is especially advantageous in rate tube measurement system 10 in that it is robust and provides consistently accurate measurements of mass flow through the rate tube measurement system.

The previously described needle valve 30 and the accumulator 34, act together to dampen the pressure pulses of the fuel flow in the rate tube measurement system 10. This helps the flow meter 40 to make an accurate measurement of the fuel injected by the fuel injector 6. Once the amount of fuel from the fuel injector 6 being tested is measured, the fuel that was injected is returned to a tank through the return hose 44 which, in the illustrated embodiment, is provided with a pressure trap 46.

The rate tube measurement system 10 in accordance with the illustrated embodiment of the present invention is also provided with a computing device 50 which is electrically connected to the various components of the fixture assembly 12 and the flow meter 40. In particular, the computing device 50 is adapted to receive the corresponding sensor outputs, e.g. sensor signals, from the high speed pressure sensor 18, the temperature sensor 20, a current probe 21 that monitors the actuation of the fuel injector 6 being tested, and the flow meter 40. The computing device 50 may be implemented using a general, multi-purpose computer, or a specialized, dedicated processor. The computing device 50 is adapted to record these outputs and process these outputs, as described in further detail below, to determine the fuel injection information such as fuel injection quantity, variation, and/or rate shape, for the pilot injection and/or post injections as well as the primary injection.

In operation, the fuel injector 6 that is to be tested is inserted into the receiving opening 14 of the fixture assembly 12, and any trapped air is purged out of the fixture assembly 12 through the purge port 16 upon insertion and securing of the fuel injector in the fixture assembly 12. The fuel injector 6 is actuated to inject fuel into the rate tube measurement system 10, the fuel being provided by the fuel supply 4. Information associated with actuation of the fuel injector 6, such as time duration, voltage, etc. as monitored by the current probe 21, is provided to the computing device 50.

The pressure of the fuel injected by the fuel injector 6 is measured by the pressure sensor 18 which provides a pressure output to the computing device 50, the pressure being indicative of the rate shape of the injection. The temperature of the injected fuel is measured by the temperature sensor 20 which provides a temperature output to the computing device 50. The amount of fuel injected is measured by the flow meter 40 which provides a flow output indicative of the average measured mass flow.

The computing device 50 stores the various outputs from the high speed pressure sensor 18, the temperature sensor 20, the current probe, and the flow meter 40. After a predetermined number of consecutive injection events are measured and stored, the computing device 50 of the rate tube measurement system 10 processes the average injection flow measured by the flow meter 40 to mg/stroke together with the pressure output. In this regard, the computing device 50 of the rate tube measurement system 10 may be provided with a software program therein for performing and/or facilitating such computations. Corrections to the calculated values may be made to compensate for back pressure, temperature, and compressibility of the fuel, to obtain the desired injection information.

Figure 2:
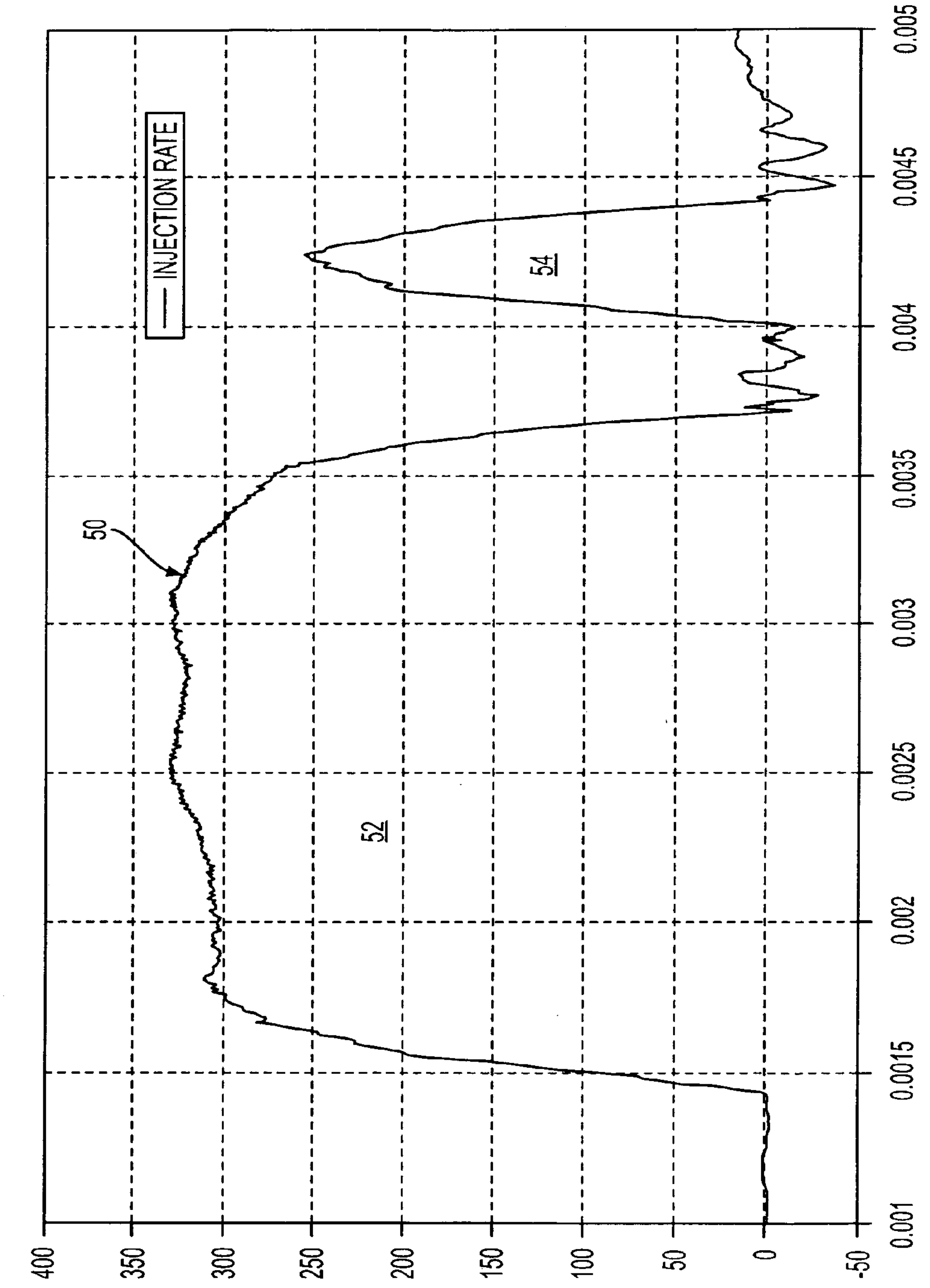
FIG. 2 is a graph showing an example multi-pulse injection having a primary injection and a post inject that has been measured using the rate tube measurement system of FIG. 1A.

In the above regard, because the pressure sensor 18 measures the pressure changes, the recorded pressure output may be processed by the computing device 50 to determine the rate shape of the injection, as well as to determine the amount of fuel injected during the pilot injection and/or post injection if a multi-pulse injection is provided. The measured dynamic pressure changes provide a rate trace curve, an example rate trace curve 50 for one injection event being shown in FIG. 2 for a multi-pulse injection. As shown, the injection rate is plotted on the y-axis along the corresponding time in the x-axis. The rate trace curve 50 includes a main injection area 52 and a post injection area 54. The area under the rate trace curve 50 can be calculated for each of the individual injection events including any pilot injection and/or post injection using the following relationship between flow rate and pressure:

$$\frac{dq}{dt} = \dot{q} = \frac{A}{a \cdot \rho} \cdot p$$

$$q = \int_{SOI}^{EOI} q \cdot dt = \frac{A}{a \cdot \rho} \cdot \int_{SOI}^{EOI} p \cdot dt$$

$A$-tube cross section $a$-speed of sound in test fluid $\rho$-density of test fluid $q$-flow rate $EOI$-end of injection $SOI$-start of injection As can be seen from the equations above, the fuel injection rate is proportional to the pressure rise. Thus, the variation in area under the rate curve 50 is equal to the shot-to-shot variation in fueling, i.e. variation in the amount of fuel injected between the injection events. In addition, for multi-pulse injections, the ratio of the area under the curves for each pulse (e.g. post injection area 54 as compared to the total area including the main injection area 52 and the post injection area 54) is equal to the fraction of average fuel injected. Thus, precise measurement of multi-pulse injections can be attained. In this regard, it should be noted that the flow meter 40 of the rate tube measurement system 10 of the illustrated embodiment is used to obtain average mg/stroke during the test because thermal effects can change the mass flow to area ratio over the long term since both a and p are temperature sensitive.

In the prior art systems such as that disclosed in the SAE Paper 2001-01-0527, the application of various filters and/or processing of outputs obtained from the disclosed pressure sensors are required due to the fact that the pressure outputs obtained from the pressure sensors are extremely noisy. This noise in the pressure outputs is largely due to the pressure reflections or waves that occur when the fuel is injected. The pressure pulses caused by the injected fuel travel through the fuel, reflect off of the pressure chamber, and travel back to the pressure sensors. Because such pressure reflections occur almost instantaneously, in a matter of a microsecond, they affect the pressure sensor readings which are recorded for analysis. Correspondingly, various filters and processing of the pressure outputs obtained from the pressure sensors are required before the pressure outputs can be used to determine the fuel injection information such as fuel injection quantity, variation, and/or rate shape. Of course, such filtering and processing is also required to determine the amount of fuel injected during the pilot injection and/or post injections.

In contrast to the prior art systems, the rate tube measurement system 10 in accordance with the present invention provides accurate measurements of the pilot injection and post injection with minimal filtering and processing of the received pressure outputs. This is made possible by the rate tube 22 which, as previously described, is elongated to have a substantial length such as approximately 18 feet in the present example embodiment. By providing the rate tube 22 downstream of the fixture assembly and the pressure sensor 18, any pressure pulses caused by the injected fuel must travel through the rate tube 22 before the pressure pulses are reflect back to the pressure sensor 18. Thus, in the illustrated example, because the rate tube 22 is approximately 18 feet long, pressure pulses must travel a total distance of approximately 36 feet before affecting the pressure output provided by the pressure sensor 18. Of course, such pressure pulses travel through the fuel in the rate tube 22 at extremely high rate of speed so that even when the rate tube 22 is approximately 18 feet in length, the pressure pulses are reflected back to the pressure sensor 18 in about 10 milliseconds. However, this duration of time is much longer than if the rate tube 22 is not provided. This increased duration of time is sufficient enough for the pressure sensor 18 to accurately measure the pressure of the fuel injected, and have the pressure output stored by the computing device 50 before the pressure pulses effect the pressure output in any appreciable manner. Thus, the rate tube displaces the reflected pressure pulses in time so as not to superimpose them on the injection event resulting in a clean signal of the injection rate. Correspondingly, the rate tube measurement system 10 of the present invention acquires the pressure measurements with minimal noise and thus, filtering and/or processing requirements are reduced so that accurate measurements of fuel injection quantity, variation, and/or rate shape of single pulse injections, and even multi-pulse injections can be determined.

It should be evident from the above description how the rate tube measurement system 10 in accordance with the present invention provides accurate measurement of the injected fuel injection systems including multi-pulse common rail injection systems, with minimal filtering and processing. In addition, it should also be evident how the rate tube measurement system 10 of the present invention combines a rate tube type system with a mass flow meter, such as a coriolis flow meter, to provide a measurement system that is accurate, robust and economical. Furthermore, it should also be evident that the rate tube measurement system 10 of the present invention can be effectively used in a manufacturing environment.

In addition, it should also be evident from the discussion above that the present invention also provides a new method of measuring the amount of fuel injected by a fuel injector. The method includes securing a fuel injector to a fixture assembly adapted to capture fuel injected by the fuel injector, actuating the fuel injector in a plurality of injection events, whether the injection events are a single pulse or multi-pulse, monitoring duration of actuation of the fuel injector during at least one injection event, measuring the pressure of the fuel injected by the fuel injector using a pressure sensor, conveying the fuel injected by the fuel injector through a rate tube fluidically connected to the fixture assembly thereby increasing the time duration required for pressure pulses to be reflected back to the pressure sensor, measuring flow of fuel through the rate tube, and determining injection information regarding the at least one injection event based on the duration of actuation, the measured pressure, and the measured flow.

As described, the determined injection information may include fuel injection quantity, variation, and/or rate shape. In this regard, the changes in the measured pressure are indicative of rate shape of the injection event. The method may include calculating an area under a rate trace curve for the injection event based on the measured pressure changes, and determining variations in the area under the rate trace curves of different injection events to determine shot-to-shot variation in injection quantity.

In one embodiment of the present method, air may be purged prior to measuring the pressure of the fuel injected. In another embodiment, the temperature of the fuel injected by the fuel injector may be measured, and the determined injection information be corrected to compensate for temperature of the fuel injected. The back pressure of the fuel injected may be measured and adjusted to simulate cylinder pressure in accordance with still another embodiment. In yet another embodiment, the method further includes dampening pressure pulses of the fuel injected.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

The invention claimed is:

1. A rate tube measurement system for measuring injected fuel comprising:

a fixture assembly having an injector receiving opening sized to receive a fuel injector therein;

a rate tube fluidically connected to said fixture assembly to receive fuel injected by the fuel injector during a plurality of injection events when the fuel injector is actuated;

a pressure sensor positioned downstream of said injector receiving opening and upstream of said rate tube, said pressure sensor being adapted to measure pressure changes in the injected fuel and provide a pressure output;

a flow meter that measures flow of the injected fuel and provides a flow output indicative of the average measured fuel flow; and a computing device electronically connected to the fuel injector to monitor duration of actuation of the fuel injector, to said pressure sensor to receive said pressure output, and to said flow meter to receive said flow output, said computing device being adapted to process said duration of actuation, said pressure output and said flow output to determine injection information regarding at least one injection event;

wherein said rate tube is elongate with a length sufficient to increase a time duration for a pressure pulse to be reflected back to said pressure sensor so that said pressure sensor measures fuel pressure before the pressure pulse is reflected back to said pressure sensor.

2. The rate tube measurement system of claim 1, wherein said determined injection information is at least one of fuel injection quantity, variation, and rate shape.

3. The rate tube measurement system of claim 1, further including a purge port that allows air to be purged from said injector receiving opening when the fuel injector is received therein.

4. The rate tube measurement system of claim 1, further including a current probe electronically connected to said computing device that monitors actuation of the fuel injector.

5. The rate tube measurement system of claim 1, further including a temperature sensor that measures the temperature of the fuel injected by the fuel injector, and provides a temperature output to said computing device.

6. The rate tube measurement system of claim 5, wherein said computing device uses said temperature output to correct said determined injection information to compensate for the temperature of the fuel injected.

7. The rate tube measurement system of claim 1, further including a rupture disc positioned downstream of said fixture assembly and upstream of said flow meter to prevent over pressurization of said rate tube measurement system.

8. The rate tube measurement system of claim 1, further including a filter upstream of said flow meter that traps debris and dampens pressure pulses in said rate tube.

9. The rate tube measurement system of claim 1, further including a valve assembly that regulates fuel flow through said rate tube measurement system.

10. The rate tube measurement system of claim 1, further including a pressure gauge that measures and displays the back pressure of said fuel in said rate tube measurement system.

11. The rate tube measurement system of claim 1, further including a relief valve adapted to allow adjustment of the back pressure of said fuel in said rate tube measurement system to simulate cylinder pressure.

12. The rate tube measurement system of claim 1, further including a remote purge supply that facilitates purging of said rate tube measurement system.

13. The rate tube measurement system of claim 1, wherein said measured pressure changes are indicative of rate shape of said plurality of injection events.

14. The rate tube measurement system of claim 1, wherein at least one of said plurality of injection events is a single pulse injection event.

15. The rate tube measurement system of claim 1, wherein at least one of said plurality of injection events is a multi-pulse injection event.

16. A rate tube measurement system for measuring injected fuel comprising:

a fixture assembly having an injector receiving opening sized to receive a fuel injector therein;

a rate tube fluidically connected to said fixture assembly to receive fuel injected by the fuel injector during a plurality of injection events when the fuel injector is actuated;

a pressure sensor positioned downstream of said injector receiving opening and upstream of said rate tube, said pressure sensor being adapted to measure pressure changes in the injected fuel and provide a pressure output;

a flow meter that measures flow of the injected fuel and provides a flow output indicative of the average measured fuel flow;

a computing device electronically connected to the fuel injector to monitor duration of actuation of the fuel injector to said pressure sensor to receive said pressure output, and to said flow meter to receive said flow output, said computing device being adapted to process said duration of actuation, said pressure output and said flow output to determine injection information regarding at least one injection event; and a relief valve adapted to allow adjustment of the back pressure of said fuel in said rate tube measurement system to simulate cylinder pressure;

wherein said relief valve is a spring loaded mechanical valve.

17. A rate tube measurement system for measuring injected fuel comprising:

a fixture assembly having an injector receiving opening sized to receive a fuel injector therein;

a rate tube fluidically connected to said fixture assembly to receive fuel injected by the fuel injector during a plurality of injection events when the fuel injector is actuated;

a pressure sensor positioned downstream of said injector receiving opening and upstream of said rate tube, said pressure sensor being adapted to measure pressure changes in the injected fuel and provide a pressure output;

a flow meter that measures flow of the injected fuel and provides a flow output indicative of the average measured fuel flow;

a computing device electronically connected to the fuel injector to monitor duration of actuation of the fuel injector, to said pressure sensor to receive said pressure output, and to said flow meter to receive said flow output, said computing device being adapted to process said duration of actuation, said pressure output and said flow output to determine injection information regarding at least one injection event; and an accumulator assembly positioned upstream of said flow meter that dampens pressure pulses in said rate tube measurement system.

18. A rate tube measurement system for measuring injected fuel comprising:

a fixture assembly having an injector receiving opening sized to receive a fuel injector therein;

a rate tube fluidically connected to said fixture assembly to receive fuel injected by the fuel injector during a plurality of injection events when the fuel injector is actuated;

a pressure sensor positioned downstream of said injector receiving opening and upstream of said rate tube, said pressure sensor being adapted to measure pressure changes in the injected fuel and provide a pressure output;

a flow meter that measures flow of the injected fuel and provides a flow output indicative of the average measured fuel flow; and a computing device electronically connected to the fuel injector to monitor duration of actuation of the fuel injector, to said pressure sensor to receive said pressure output, and to said flow meter to receive said flow output, said computing device being adapted to process said duration of actuation, said pressure output and said flow output to determine injection information regarding at least one injection event;

wherein said flow meter is a mass flow meter that measures the mass of fuel flowing therethrough.

19. A rate tube measurement system for measuring injected fuel comprising:

a fixture assembly having an injector receiving opening sized to receive a fuel injector therein;

a rate tube fluidically connected to said fixture assembly to receive fuel injected by the fuel injector during a plurality of injection events when the fuel injector is actuated;

a pressure sensor positioned downstream of said injector receiving opening and upstream of said rate tube, said pressure sensor being adapted to measure pressure changes in the injected fuel and provide a pressure output;

a flow meter that measures flow of the injected fuel and provides a flow output indicative of the average measured fuel flow; and a computing device electronically connected to the fuel injector to monitor duration of actuation of the fuel injector, to said pressure sensor to receive said pressure output, and to said flow meter to receive said flow output, said computing device being adapted to process said duration of actuation, said pressure output and said flow output to determine injection information regarding at least one injection event;

wherein said mass flow meter is a coriolis mass flow meter.

20. A rate tube measurement system for measuring injected fuel comprising:

a fixture assembly having an injector receiving opening sized to receive a fuel injector therein;

a rate tube fluidically connected to said fixture assembly to receive fuel injected by the fuel injector during a plurality of injection events when the fuel injector is actuated;

a pressure sensor positioned downstream of said injector receiving opening and upstream of said rate tube, said pressure sensor being adapted to measure pressure changes in the injected fuel and provide a pressure output;

a flow meter that measures flow of the injected fuel and provides a flow output indicative of the average measured fuel flow; and a computing device electronically connected to the fuel injector to monitor duration of actuation of the fuel injector, to said pressure sensor to receive said pressure output, and to said flow meter to receive said flow output, said computing device being adapted to process said duration of actuation, said pressure output and said flow output to determine injection information regarding at least one injection event;

wherein said measured pressure changes are indicative of rate shape of said plurality of injection events and said computing device determines an area under a rate trace curve for each of said plurality of events based on said measured pressure changes.

21. A rate tube measurement system for measuring injected fuel comprising:

a fixture assembly having an injector receiving opening sized to receive a fuel injector therein;

a rate tube fluidically connected to said fixture assembly to receive fuel injected by the fuel injector during a plurality of injection events when the fuel injector is actuated;

a pressure sensor positioned downstream of said injector receiving opening and upstream of said rate tube, said pressure sensor being adapted to measure pressure changes in the injected fuel and provide a pressure output;

a flow meter that measures flow of the injected fuel and provides a flow output indicative of the average measured fuel flow; and a computing device electronically connected to the fuel injector to monitor duration of actuation of the fuel injector, to said pressure sensor to receive said pressure output, and to said flow meter to receive said flow output, said computing device being adapted to process said duration of actuation, said pressure output and said flow output to determine injection information regarding at least one injection event;

wherein said computing device is a computer having a program adapted to determine an area under a rate trace curve for each of said plurality of injection events based on said measured pressure changes.

22. A method of measuring the amount of fuel injected by a fuel injector comprising:

securing a fuel injector to a fixture assembly adapted to capture fuel injected by the fuel injector;

actuating the fuel injector in a plurality of injection events and monitoring duration of actuation of the fuel injector during at least one injection event;

measuring the pressure of the fuel injected by the fuel injector using a pressure sensor;

conveying the fuel injected by the fuel injector through a rate tube fluidically connected to said fixture assembly, said rate tube having a length sufficient to provide a time duration of sufficient length to allow measurement of the pressure of the fuel injected before pressure pulses are reflected back to said pressure sensor;

measuring flow of fuel through said rate tube; and determining injection information regarding said at least one injection event based on said duration of actuation, measured pressure, and measured flow.

23. The method of claim 22, wherein said determined injection information regarding said at least one event is at least one of fuel injection quantity, variation, and rate shape.

24. The method of claim 22, wherein changes in said measured pressure are indicative of rate shape of said at least one injection event.

25. The method of claim 22, further including purging air prior to measuring the pressure of the fuel injected.

26. The method of claim 22, further including measuring the temperature of the fuel injected by the fuel injector, and correcting said determined injection information to compensate for temperature of the fuel injected.

27. The method of claim 22, further including measuring and adjusting back pressure of the fuel injected to simulate cylinder pressure.

28. The method of claim 22, wherein at least one of said plurality of injection events is a single pulse injection event.

29. The method of claim 22, wherein at least one of said plurality of injection events is a multi-pulse injection event.

30. A method of measuring the amount of fuel injected by a fuel injector comprising:

securing a fuel injector to a fixture assembly adapted to capture fuel injected by the fuel injector;

actuating the fuel injector in a plurality of injection events and monitoring duration of actuation of the fuel injector during at least one injection event;

measuring the pressure of the fuel injected by the fuel injector using a pressure sensor;

conveying the fuel injected by the fuel injector through a rate tube fluidically connected to said fixture assembly, said rate tube having a length sufficient to provide a time duration of sufficient length to allow measurement of the pressure of the fuel injected before pressure pulses are reflected back to said pressure sensor;

measuring flow of fuel through said rate tube;

determining injection information regarding said at least one injection event based on said duration of actuation, measured pressure, and measured flow; and dampening pressure pulses of the fuel injected.

31. A method of measuring the amount of fuel injected by a fuel injector comprising:

securing a fuel injector to a fixture assembly adapted to capture fuel injected by the fuel injector;

actuating the fuel injector in a plurality of injection events and monitoring duration of actuation of the fuel injector during at least one injection event;

measuring the pressure of the fuel injected by the fuel injector using a pressure sensor;

conveying the fuel injected by the fuel injector through a rate tube fluidically connected to said fixture assembly, said rate tube having a length sufficient to provide a time duration of sufficient length to allow measurement of the pressure of the fuel injected before pressure pulses are reflected back to said pressure sensor;

measuring flow of fuel through said rate tube; and determining injection information regarding said at least one injection event based on said duration of actuation measured pressure, and measured flow;

wherein said flow of fuel is measured by a mass flow meter.

32. The method of claim 31, wherein said mass flow meter is a coriolis mass flow meter.

33. A method of measuring the amount of fuel injected by a fuel injector comprising:

securing a fuel injector to a fixture assembly adapted to capture fuel injected by the fuel injector;

actuating the fuel injector in a plurality of injection events and monitoring duration of actuation of the fuel injector during at least one injection event;

measuring the pressure of the fuel injected by the fuel injector using a pressure sensor;

conveying the fuel injected by the fuel injector through a rate tube fluidically connected to said fixture assembly said rate tube having a length sufficient to provide a time duration of sufficient length to allow measurement of the pressure of the fuel injected before pressure pulses are reflected back to said pressure sensor;

measuring flow of fuel through said rate tube; and determining injection information regarding said at least one injection event based on said duration of actuation, measured pressure and measured flow;

wherein changes in said measured pressure are indicative of rate shape of said at least one injection event;

the method further including calculating an area under a rate trace curve for said at least one injection event based on said measured pressure changes.

34. The method of claim 33, further including determining variations in the area under the rate trace curves of different injection events to determine variation in shot-to-shot injection quantity.

* * * * *